United States Patent [11] 3,622,559

| [72] | Inventors | Raldon R. Wiles;<br>Christian J. B. Smit, both of Corona, Calif. |
|---|---|---|
| [21] | Appl. No. | 679,714 |
| [22] | Filed | Nov. 1, 1967 |
| [45] | Patented | Nov. 23, 1971 |
| [73] | Assignee | Sunkist Growers Inc.<br>Los Angeles, Calif. |

[54] METHOD FOR PRODUCING PECTINS HAVING HIGH RESISTANCE TO BREAKAGE AND HIGH CAPABILITY FOR GELLING IN THE PRESENCE OF CALCIUM
13 Claims, 3 Drawing Figs.

| [52] | U.S. Cl. | 260/209.5 |
|---|---|---|
| [51] | Int. Cl. | C08b 19/02 |
| [50] | Field of Search | 260/209.5 |

[56] References Cited
UNITED STATES PATENTS

| 2,444,266 | 6/1948 | Owens et al. | 260/209.5 |
|---|---|---|---|
| 2,480,710 | 8/1949 | Bryant | 260/209.5 |

OTHER REFERENCES

Kertesz, The Pectic Substances, Interscience Publishers, N.Y. (1951) pages 49, 50, 63 to 66, and 69 to 71

*Primary Examiner*—Donald E. Czaja
*Assistant Examiner*—M. I. Marquis
*Attorney*—Paul A. Weilein ABSTRACT: The invention involves the production of pectins, especially from citrus peel, and produced for use in gels where strong resistance to breakage and substantial freedom from weeping are desired. While such pectins are produceable from some other fruits such as apples, and also from beets, these pectins are preferably obtained from citrus peels such as lemon and orange peels. Chemically, the structure is generally conceived as being made up of long chains of anhydro-galacturonic acid units. The carboxyl groups of the galacturonic acid units are either free, present in the form of a salt, an acid amide, or a methyl ester, somewhat as indicated in FIG. 2.

Fig. 1.

1. SOURCE MATERIAL -- FRESH CITRUS PEEL
2. SHRED AND WASH
3. EXTRACT PECTIN -- IN MILD ACID -- ca 70°C to 75°C
4. FILTER PECTIN LIQUOR
5. COOL -- ca 50°C
6. PRECIPITATE PECTIN -- AS WITH ALUMINUM CHLORIDE AND AMMONIUM HYDROXIDE
7. DRAIN, PRESS AND SHRED
8. WASH -- IN ACIDIFIED ALCOHOL -- DRAIN -- MOL. WT. 180,000 TO 200,000 -- METHOXYL CONTENT 10% TO 10.5%
9. DEMETHYLATE -- FIRST STAGE TO 7% TO 8.5% METHOXYLS IN ACIDIFIED ALCOHOL -- ca 15°C TO 30°C, DRAIN -- MOL. WT. 160,000
10. RINSE -- WITH ALCOHOL -- DRAIN
11. BUFFER -- WITH ALKALI IN ALCOHOL -- DRAIN
12. DEMETHYLATE -- SECOND STAGE TO 5% TO 6% METHOXYLS IN AMMONIACAL ALCOHOL -- ca 5°C TO 15°C, DRAIN -- MOL. WT. 120,000 TO 160,000
13. RINSE -- WITH ALCOHOL -- DRAIN
14. BUFFER -- WITH ACID IN ALCOHOL -- DRAIN
15. RINSE -- WITH ALCOHOL -- DRAIN
16. DRY AND GRIND PRODUCT

INVENTORS.
RALDON R. WILES
CHRISTIAN J. B. SMIT
BY Paul A. Weilein
ATTORNEY.

INVENTORS.
RALDON R. WILES
CHRISTIAN J.B. SMIT
BY Paul A. Weilein
ATTORNEY

METHOD FOR PRODUCING PECTINS HAVING HIGH RESISTANCE TO BREAKAGE AND HIGH CAPABILITY FOR GELLING IN THE PRESENCE OF CALCIUM

According to this invention, a desirable pectin for the purposes intended possesses a molecular weight (moisture-free basis) of about 120,000 and up to about 160,000. In order to present the desired characteristics, such a pectin has a methoxyl content ($OCH_3$) of about 5.0 percent to 6.0 percent (moisture-free basis). In the initial or early stages of pectin production, and as pectins have heretofore been known, the methoxyl percentage may range from around 9 to 10 percent, such percentages being, however, undesirable as hereinafter indicated. Methoxyl percentages below about 5 percent are undesirable because, as the percentages go lower, there is a corresponding increase in undesirable sensitivity to calcium. Also, as the molecular weight falls below about 120,000, there is a tendency to lose desirable gel characteristics, such as resilience, resistance to breakage, and freedom from syneresis.

A further factor in arriving at the characteristics necessary for a pectin in accordance with this invention is the ratio of what is termed gel strength of the pectin to what is termed gel power of the pectin. Gel strength is a measure of the resistance to rupture or breakage of a gel. High resistance to such breakage is desirable during handling and transport. Gel power is a measure of resistance to sag. Gels can be made with these pectins without added sugar and they are therefore extremely valuable for use in the so-called low calorie or dietetic foods.

BACKGROUND

The various commercial pectins which have been known for a long time, may be divided into two groups according to the type of gel which is made with them. Ordinary high methoxyl pectin (greater than 7 percent $OCH_3$) requires acid conditions and a high soluble solids content in order to give a satisfactory jelly. Low methoxyl pectin (3.0 to 6.0 percent $OCH_3$), on the other hand, forms gels in the presence of suitable multivalent cations without need for any additional soluble solids in the gel. Calcium is the cation ordinarily used in the preparation of such gels and the amount of calcium present is very important. Too low a concentration results in weak gels which break or rupture readily during handling or transportation. Too much calcium, on the other hand, causes brittle gels which often exhibit a tendency to weep or synerese. Pectins of this nature which have molecular weights of around 100,000 are represented by those disclosed in Pat. No. 2,480,710 of Aug. 20, 1949 to Bryant. These pectins have had their place in the industry but we have now discovered that pectins may be greatly improved in order to provide gel products which do not break or rupture easily on handling or transport, and are not subject to undue syneresis.

THE INVENTION

This invention involves, therefore, a new type pectin having the stated characteristics, which is a type of pectin having a molecular weight in excess of about 120,000, a gel strength to gel power ratio in excess of about 1.3, and a methoxyl content of between about 5.0 percent and about 6.0 percent. These determinations of gel strength and gel power are accomplished by methods disclosed hereinafter. The invention involves also the method of producing these pectins, which methods are controllable and are controlled in the operating procedures starting with the initial processing of the citrus peel in a manner herein disclosed.

THE DRAWINGS

In the accompanying drawings:

FIG. 1 is a flow sheet illustrating the steps of producing the invention;

METHOD OF PROCESSING CITRUS PEEL AND RECOVERY OF PECTIN THEREFROM

Detailed Procedure

Figure 2:
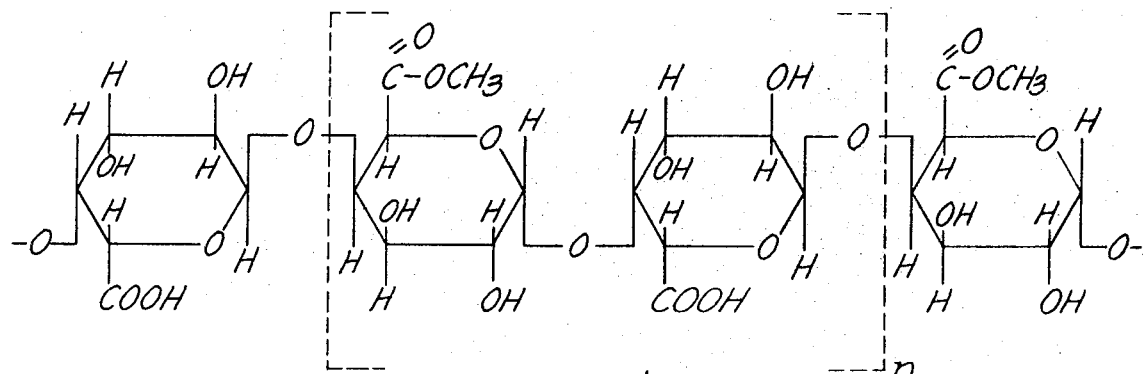
FIG. 2 shows a portion of the probable structural formula of a pectin molecule for better indicating the position of methoxyl groups in pectin molecules.

Citrus peel is commonly processed for recovery of pectin at temperatures around 90° to 100° C., that is, temperatures approaching the boiling point of water. Such conditions are herein considered as objectionably severe conditions, because they result in products whose molecular weights are too low for the present invention. Such usual treatment and also the present involve the use of aqueous acid solutions approximating pH values in the order of 2.3 to 2.8. The acid used may be hydrochloric acid, nitric acid, sulfuric acid, sulfurous acid, citric acid, acetic acid, or phosphoric acid.

For the present disclosure sulfurous acid will be considered the acid employed for the initial peel extraction, but any of the others mentioned may be used. In employing citrus peels the entire peel, including the outermost colored layer known as the flavedo and containing the essential oils, may be used, but it is also in order to shave off the outer flavedo layer and treat only the white layer or albedo.

An important consideration for the treatment of citrus peel in accordance with this invention is to proceed at a considerably lower than usual temperature level. For this purpose instead of operating at an initial extraction temperature of around 90° to 100° C., the initial operation will proceed at about 70° C. and for around 1 to 2 hours, whereby to yield an appropriate starting pectin extract of high molecular weight suitable for the purpose.

The following example is a preferred procedure, and one presently considered as the best method of operating the invention.

Three thousand kilograms of fresh lemon peel which has been shredded, washed and drained (Step 2 of the flow sheet of FIG. 1) is measured into a tank with 3800 liters of water and 2200 liters of about a 1.5 percent solution of sulfurous acid, to yield a pH of about 2.2 or 2.3 as well understood by chemists in this art. The batch is heated to 70° to 75° C. (Step 3 on flow sheet) by steam injection and maintained at that temperature for about 1 hour before separating the pulp from the extraction liquor. The clear filtered liquor (Step 4 on flow sheet) is then degassed of part of its sulfur dioxide and cooled to about 50° C. (Step 5 on flow sheet), whereupon aluminum chloride and ammonium hydroxide are added to effect precipitation of the pectin by the well-known process (Step 6 on flow sheet), as in the art.

The precipitate is drained and pressed (Step 7) until it contains about 8 percent to 10 percent dry solids equivalent. Such pressed precipitate is then shredded into particles of less than one-eighth inch diameter and suspended in about 1.3 volumes of 75 percent alcohol to effect further dehydration of the precipitate. Separation of the alcohol-rinsed precipitate is accomplished and the solids are then suspended in an acid-alcohol mixture (Step 8) which is about 60 percent alcohol, 10 percent concentrated HCl and 30 percent water. About 30 minutes of stirring in this mixture is allowed to wash out the aluminum salts used in precipitation and any other acid soluble material.

Such washed precipitate now has a molecular weight of about 180,000 to 200,000 and a methoxyl content of about 10.0 to 10.5 percent, both expressed on a moisture-free basis.

Figure 3:
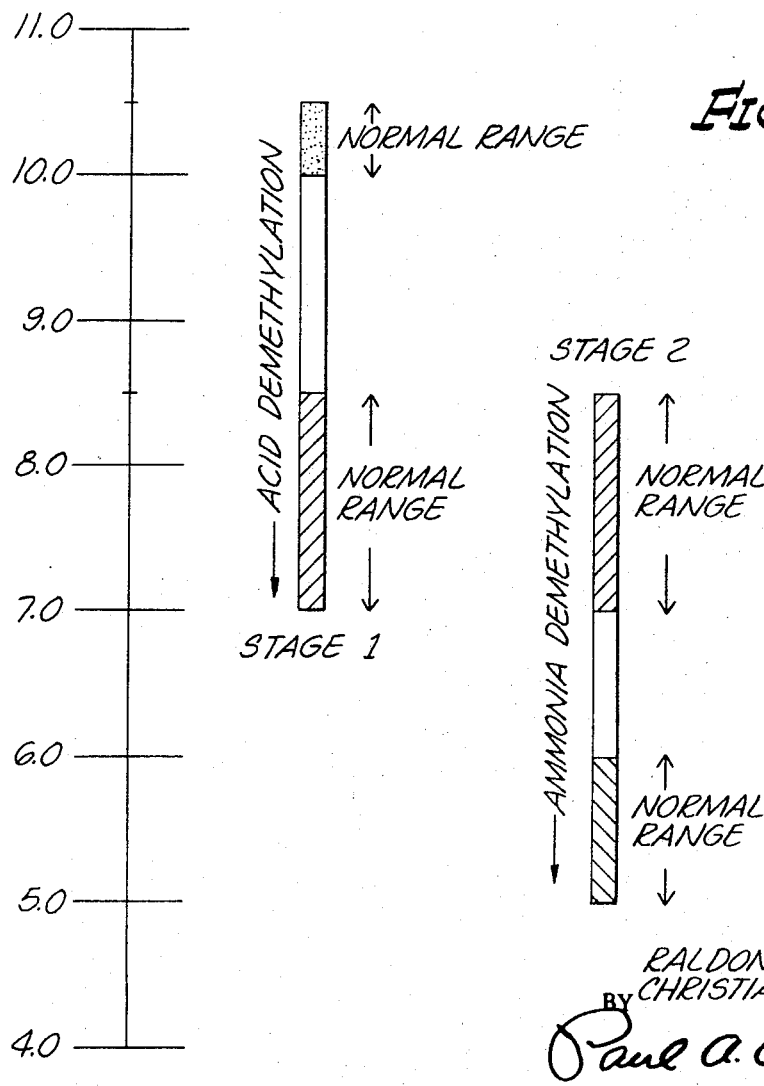
FIG. 3 presents a chart indicating both the extent to which acid demethylation is carried (Stage 1) in producing the improved high molecular weight pectin hereof and also that portion of the process (Stage 2) employing ammonium hydroxide.

As an important feature of this invention, it is desired that the methoxyl content be next reduced to about 7.0 to 8.5 percent with little or negligible loss in molecular weight in a first demethylation stage, as indicated in FIG. 3. To accomplish this step, the washed precipitate, after filtering off the wash liquid, is suspended in a fresh acid-alcohol mixture containing about 60 percent alcohol, about 30 percent water, and about 10 percent concentrated HCl such that the mixture is about 1.0 normal with respect to the HCl. The temperature of this mixture is maintained at a lower temperature than previous steps and at about 30° C. or less for about 24 hours or longer until the methoxyl content has been reduced (Step 9) to about 7.0 to 8.5 percent, but with the pectin still having retained a molecular weight characteristic in the range of about 160,000 to 200,000. Shorter reaction times can be obtained with higher temperatures (such as 40° to 50° C.) to obtain the 7.0 to 8.5 percent methoxyl content, but depolymerization proceeds at such higher temperatures at increased rates which result in lower molecular weights than are desired in the product of this invention, although this may be done where such a product is acceptable.

At the end of the acid alcohol demethylation time, the suspension is drained and a succession of two or three rinses are applied, each consisting of enough 75 percent alcohol to result in a fluid mixture (Step 10) as well understood.

After draining of the last mentioned rinse alcohol, fresh 75 percent alcohol is added to make a fluid mixture and enough alkali buffer solution such as ammonium hydroxide, sodium carbonate or a mixture of the two, is added to adjust the acidity of the suspension (Step 11) to within the desired range. When the proper amount of alkali has been added and allowed to reach diffusion equilibrium with the acidified pectin for about 30 minutes, the pH of the suspension will be about 5.2 to 5.8 and the pectin at this point, upon drying and preparation into a one percent sol will yield a pH value of 3.6 to 4.2. This range is considered convenient because it is in common use with other pectin product processing and is suitable as a level of uniform acidity for subsequent mixing with the ammonia-alcohol reaction step to follow.

As another important feature of this invention, the methoxyl content is further reduced to about 5.0 to 6.0 percent by a second stage treatment in an ammonia-alcohol mixture according to the methods disclosed in U.S. Pat. No. 2,480,710 except that in order to obtain the desired result of a pectin product having 5.0 to 6.0 percent methoxyl content and also a molecular weight of about 120,000 to 150,000, two important considerations or stages are involved as illustrated in FIG. 3. The first such consideration is the first demethylation stage (Step 9), already described, wherein the first stage reduction of methoxyl content is carried out under acid-alcohol conditions where effects on molecular weight are relatively slight. The second important consideration is that a second stage reduction of methoxyl content is necessary to achieve the desired level of 5.0 to 6.0 percent methoxyl and that such treatment is carried out in an ammonia-alcohol mixture at still lower temperatures to minimize loss of molecular weight. The pectin product resulting from such a two-stage reduction in methoxyl content has been discovered to yield jellied products of superior gel characteristics when compared with those from either a pectin product resulting from a prolonged one-step acid-alcohol treatment or from a one-step ammonia-alcohol treatment.

To accomplish this second-stage reduction of methoxyl content, 900 kilogram of the acid-alcohol washed, acid-alcohol demethylated, rinsed, buffered and filtered precipitate from step 11, containing about 300 kilograms dry pectin equivalent, which is further characterized by a methoxyl content of 7.0 to 8.5 percent (moisture-free basis) and a molecular weight of 160,000 to 190,000 (moisture-free basis), is suspended in 1500 liters of alcohol refrigerated so that the temperature of the mixture does not exceed about 12° to 13° C. While the suspension is continuously stirred, 250 liters of concentrated ammonium hydroxide (about 26 percent $NH_3$) is added (step 12). The resulting reaction mixture is then held at a temperature of 15° C. or less for about 45 minutes or longer, depending upon actual temperature and also on the specific methoxyl content of the pectin before the reaction is started. For example, a pectin with 7.0 percent methoxyl content at 15° C. requires about 40 minutes reaction time while a pectin with 8.5 percent methoxyl content at 10° C. requires about 120 minutes to undergo methoxyl reduction to 5.5 percent under the conditions described.

At the end of the treating period the ammoniacal alcohol is quickly drained from the suspension (to avoid continuing action) and 1500 liters of 75 percent alcohol is added as indicated in rinse step 13, stirred with the pectin for 5 minutes and then quickly drained off. Another 1500 liters of 75 percent alcohol is added and enough concentrated hydrochloric acid (average concentration about 30percent HCl) is added to adjust the acidity of the suspension to within the desired range (step 14). When the proper amount of hydrochloric acid (usually 30 to 50 liters) has been added and allowed to reach diffusion equilibrium with the ammoniacal pectin for about 30 minutes, the pH of the suspension will be about 3.3 to 3.6 and the finished product, dried and ground, will, in a one percent sol, yield a pH value of 3.8 to 4.3. This range is considered optimum from the standpoint of the usefulness of the product and because undesirable modifications of the product may occur at pH values higher or lower than these, as will be understood in this art.

The suspension from the buffering step is then drained off and a final rinse (step 15) is applied with 1500 liters of 85 percent alcohol. After removal of the last mentioned rinse, the pectin is dried and ground (step 16) to pass a 60-mesh screen, which is deemed an optimum size.

THE PROCESS IN GENERAL

The foregoing, which used lemon peel as a starting material and which had been acid treated at a relatively low temperature initially, namely about 70° C., is typical of a number of runs with mildly acid treated materials using pectins in the 200,000 molecular weight range or from about 180,000 to 225,000. Thus, citrus peel is treated in a standard acid bath at an uncommonly low temperature of around 70° C. (or sometimes up to 75° or 80° C.) to yield the initial pectin batch which possesses the indicated high molecular weight and from which the pectin is precipitated by such known means as alcohol precipitation or aluminum chloride or other metal precipitant solution, such precipitated pectins being then given first a preliminary acid-alcohol treatment to remove acid soluble nonpectin materials and then a further acid-alcohol treatment such as suspension in an acid-alcohol mixture which is 1.0 Normal with respect to HCl and contains 60 percent alcohol (by volume) at temperatures not exceeding about 30° C. for as long a time as needed (such as 24 hours) to reduce the methoxyl content to about 7.0 to 8.5 percent (expressed on moisture-free basis). Under these conditions molecular weight changes are held to a minimum, resulting in values still above about 160,000.

Thereafter, following successive rinsings with neutral alcohol and buffering with a suitable alkali such as ammonium hydroxide, sodium carbonate or a mixture of these, a further reduction of the methoxyl content into the desired and optimum range of 5 to 6 percent is effected by suspension of the pectin in a mixture of ammonia and alcohol. The time of reaction is carefully controlled and is dependent upon the concentration of ammonia used and the temperature employed. In order to keep the lowering of the molecular weight during this treatment to a minimum the temperature is kept well below a maximum of about 15° C. The ammonia concentration is such that the alkali normality of the slurry is about 1.0 to 2.0.

Under these conditions the methoxyl content of the pectin is reduced to the desired and optimum range of 5 to 6 percent while the molecular weight loss is kept at a minimum, resulting in a final molecular weight level of 120,000 to 160,000 (step 12).

Rinsing is accomplished first with neutral, then acidified alcohol to buffer the pectin to a suitable pH such that a 1 percent sol of the final pectin will yield a pH of about 3.8 to 4.3.

Thus, the unique combination of milder than usual temperatures, such as 70° C. for extraction of pectin from citrus peel, 15° to 30° C. for acid-alcohol demethylation treatment to about 7 to 8.5 percent methoxyl, and 5° to 15° C. for ammonia-alcohol demethoxylation to about 5 to 6 percent, results in a pectin capable of forming gels in the presence of calcium, such gels having qualities of resilience, yet resistance to breakage or rupture, to a greater degree than otherwise obtainable.

In connection with the alcohol used, any of the lower carbon aliphatic alcohols may be used, from the one-carbon methyl alcohol up to and including the butyl alcohols. However, isopropyl alcohol (isopropanol) is preferably used because it is least costly and quite easy to handle throughout the various operations.

The ratio of liquids to solids during demethylation, washing or buffering is not critical, but handling is facilitated and acid or alkaline concentrations do not change unduly if a liquid-to-solids ratio of at least 6:1 is used.

While concentrations, temperatures and times are not too critical, nonetheless these factors are important within reasonable limits, as has been variously indicated in various relationships herein.

With respect to the physical characteristics of the pectin product of this invention, it will have a molecular weight of 120,000 or higher such as up to about 160,000, with a methoxyl content of 5 to 6 percent. A gel made from it which has a solids content of 30 percent and a pH of 3 will have a gel strength to gel power ratio of about 1.3 or higher.

As previously stated, pectins according to this invention may be derived from any of the citrus fruits. These include navel and valencia oranges, lemons, grapefruit, and tangerines. In general, lemons tend to yield the highest molecular weights. Such pectins are capable of producing with aqueous fluids superior gels which require little or no sugar such as low-calorie gels or preserves. Such gels are smooth and tender and also show excellent resistance to breakage in handling and resistance to liquid separation. These qualities are uniquely combined in the product of this invention, making it a superior gelling agent for the preparation of low solids gels.

DEFINITIONS

A number of terms are used in this specification which are in general well known in the industry. However, in order to make it clear as to what these terms are intended to indicate here, the following are presented by way of definition of the terms.

Smooth texture—This indicates the feel in the mouth and on the tongue of jelly-like materials, as distinguishing from gels or jellies which are inclined to feel and appear rather granular.

Tender—This refers to gels or jellies which tend to break down readily.

Gel strength—This refers to a measure of the resistance to breakage or rupture. A summary of the test method for determining this strength appears hereinafter.

Gel power—This refers to the ability to resist sag when the body of the gel is set out on a surface. A summary of the test method for determining gel power is given later herein.

Resilient—This term refers to the ability of a gel under stress to deform greatly without rupture and which tends to return to its original shape upon removal of the stress.

Low-methoxyl pectin—This term usually applies to pectins with a methoxyl content between about 3 and 6 percent.

Calcium tolerance—This refers to the ability of the pectin to form satisfactory gels in the presence of calcium ions, as in hard water, without deleteriously affecting the texture of the gel or the jellied products being formed. Greater tolerance results as the methoxyl content increases up into the range of 5 to 6 percent. As the methoxyl content decreases, the sensitivity for calcium ions increases.

TEST METHODS

The terms "methoxyl content," "molecular weight," "gel power," and "gel strength," have been used herein to describe characteristics of the product of this invention. Methods for determining these factors follow.

Methoxyl Percentage

A sample is washed with acid-alcohol to remove ash and buffer constituents and other diluents. Residual acid is completely rinsed from the sample with 60 percent isopropanol. A portion equivalent to 0.5 gram of the original sample is titrated in $CO_2$-free water with 0.1 Normal NaOH to phenolphthalein end-point. 20.0 mls. 0.5 Normal NaOH is added and the stoppered flask is allowed to stand 15 minutes while the $OCH_3$ groups are split off the galacturonic acid molecular chain. 20.0 mls. 0.5 Normal HCl is added and the excess acidity (resulting from the loss of part of the NaOH in replacing the $OCH_3$ groups) is titrated with 0.1 N NaOH to phenolphthalein end-point. The number of mls. required multiplied by 0.62 equals "percent methoxyl." Correction for moisture of original sample then permits expression of moisture-free value.

Molecular Weight

A 0.1 percent sol is prepared from the sample in a 1 percent solution of sodium hexametaphosphate. The viscosity of a filtered portion (7 ml.) of the sol is determined with a modified Ostwald-Cannon-Fenske Series 100 pipette. The molecular weight is calculated using the formula:

$$\text{Molecular weight} = \frac{\left(\eta_r^{\frac{1}{P}} - 1\right)P}{CK}$$

where $\eta_r$=relative viscosity
P=6
C=concentration in terms of grams moisture-free sample per 100 mls. of sol.
K=4.7+10^{7E\cdot 5}

Gel Power

A water gel is prepared to have about 31 percent soluble solids, a pH of 2.9 to 3.1 and after 18 to 24 hours storage at 25° C. will yield a sag measurement between 14.0 and 27.0 percent when checked by the Exchange Ridgelimeter. The assumed G.P. (600 g. batch divided by the number of grams pectin used) is multiplied by a factor corresponding to percent sag from a table to give true Gel Power.

Gel Strength

The same water gel used for Gel Power may be used for measuring its resistance to rupture. Slices are cut 7 mm. thick and are tested with a Gelslice Penetrometer. The average reading in grams required to rupture the slices is referred to a factor table. The factor is multiplied times the assumed Gel Strength (600 g. batch divided by number of grams pectin used) to give the true Gel Strength.

Moisture Percentage 1.0 g. sample is dried for 2 hours in 105° C. oven and weighed.

While specific details have been shown and described, it should be understood that changes and alterations may be resorted to without departing from the spirit of the invention as defined in the appended claims.

Thus, our invention involves preparing an initial pectin solution, as from citrus peel, at temperatures below 90° C., such as between 60° or 65° C. and 80° C., with a mild acid treatment which yields pectin of about 180,000 to 225,000 molecular weight and methoxyl content of about 9 to about 11 percent; precipitating the pectin with any usual or preferred precipitant; acid treating the precipitated pectin at a lowered temperature between 15° and about 50° C. to retain a molecular weight of at least 160,000 and yield a methoxyl content in a range of about 7 to 8.5 percent; and ammonium treating the resultant pectin precipitate below 15° C. to yield a methoxyl content in the range of about 4.5 to 7 percent and a molecular weight of at least about 120,000, which temperature might even be below 0° C.

We claim:
1. A method for producing a pectin product including the steps of:
   extracting citrus peel at a mild pectin conversion and extraction temperature in a range of about 70° to 80° C. with an aqueous acid solution in a range between about pH 2.3 and pH 2.8 and thereby producing in the acid solution pectin having a molecular weight approximately in the range of 180,000 to 220,000;
   treating a quantity of such pectin solution with a precipitant for pectin;
   recovering and treating the pectin precipitate at a temperature in a range of about 15° to about 30° C. with an acid-alcohol solution ranging between about 1.5 N HCl and about 0.7 N HCl to reduce the methoxyl content into a range of about 7 to 8.5 percent;
   and filtering and recovering the pectin precipitate.

2. A method for producing a pectin product including the steps of:
   extracting citrus peel at a mild pectin conversion and extraction temperature in a range below about 70° to 80° C. with an aqueous acid solution in a range between about pH 2.3 and pH 2.8 and thereby producing in the acid solution pectin having a molecular weight approximately in the range of 180,000 to 220,000;
   treating a quantity of such pectin solution with a precipitant to yield pectin precipitate;
   recovering and treating the precipitate at a temperature in a range of about 15° to about 30° C. with an acid-alcohol solution ranging between about 1.5 N HCl and about 0.7 N HCl to reduce the methoxyl content into a range of about 7 to 8.5 percent;
   filtering, alcohol washing and buffering the precipitate;
   treating the filtered alcohol-washed buffered precipitate with concentrated ammonium hydroxide in alcohol to reduce further the percentage of methoxyl groups;
   and filtering, washing, buffering, rinsing, and recovering the pectin.

3. A method as in claim 2 wherein the ammonium hydroxide treatment is applied to lower the methoxyl content to at least about 6 percent.

4. A method as in claim 3 wherein the ammonium hydroxide yields a normality of about 1.0 to 2.0.

5. A method as in claim 3 wherein the proportion of liquids added and that present in the precipitate during treatment to the pectin is at least six to one.

6. A method as in claim 4 wherein the temperature during the ammonia treatment does not exceed 15° C.

7. A method for reducing the methoxyl content of extracted high molecular weight pectin while reducing the molecular weight minimally, including:
   treating an extracted pectin approximating 200,000 molecular weight and having a methoxyl content in the order of 10 percent with aliphatic alcohol acidified to about 1.0 Normal with HCl at a temperature not exceeding about 50° C. to reduce the methoxyl content to around 7 to 8.5 percent;
   removing the acid alcohol reactant;
   treating the resultant pectin with an ammoniacal aliphatic alcohol at a lowered temperature in the order of 5° to 15° C. to reduce the methoxyl content into a range of about 5 to 6 percent;
   freeing the pectin product from the ammoniacal alcohol reactant;
   and recovering the pectin product.

8. A method as in claim 7 wherein freeing the product from the reactant includes buffering and rinsing the product.

9. A method for producing high molecular weight pectin having a methoxyl content in the order of 5 to 6 percent, including:
   extracting pectin from a pectin-bearing fruit with mild acid extraction in the order of 2.5 pH for around 1 to 2 hours at a temperature around 70° to 75° C. to yield a pectin content having a molecular weight around 200,000 and above;
   precipitating pectin from the pectin extraction liquor to provide a pectin of around 200,000 molecular weight and above and a methoxyl content approximating 10 percent;
   treating the precipitated pectin with an acidified aliphatic alcohol of around 1.0 Normal HCl and at a temperature below about 30° and above about 15° C. to reduce the methoxyl content into a range of about 7 to 8.5 percent while maintaining the molecular weight above about 160,000
   filtering, alcohol-washing, and buffering the resultant pectin;
   treating the washed pectin with an ammoniacal aliphatic alcohol of about 1.0 to about 2.0 Normality with respect to NH₄OH and at a lowered temperature in the order of 5° to 15° C. to lower the methoxyl content into the range of 5 to 6 percent while retaining a molecular weight above about 120,000;
   separating the product from the reactant;
   and recovering the product.

10. A method as in claim 9 including buffering the recovered product.

11. A method as in claim 9 wherein the acid-alcohol treatment is conducted for at least about 24 hours, and the ammonia-alcohol treatment is conducted for at least about 30 minutes.

12. A method of producing high molecular weight pectin having a methoxyl content in the order of 4.5 to 7 percent, including:
   extracting pectin from a fruit with mild acid extraction in the order of 2.5 pH for around 1 to 2 hours at a temperature around 70° to 80° C. to yield a pectin content having a molecular weight in the order of 180,000 to 220,000;
   treating such pectin solution with a pectin precipitant;
   recovering and treating the pectin precipitate at a temperature in a range of about 15° to about 30° C. with an acidified aliphatic alcohol of around 0.7 N HCl to 1.5 N HCl to reduce the methoxyl content into a range of about 7 to 8.5 percent while retaining a molecular weight of at least about 160,000;
   filtering, washing and buffering the precipitate;
   treating such precipitate with concentrated ammonium hydroxide in a lower carbon aliphatic alcohol at a temperature below about 15° C. to yield a methoxyl content in the range of about 4.5 to 7 percent with a molecular weight of at least about 120,000;
   freeing the resultant precipitate of reactants;
   and recovering the pectin product.

13. A method of producing a high molecular weight pectin having a methoxyl content in the order of 4.5 to 7 percent, and involving:
   extracting pectin from fruit with a mild acid treatment at temperatures below 90° C. in a range between about 60° and 80° C. to yield a pectin product having a molecular weight above about 180,000 with a methoxyl content above about 9 percent;
   treating such pectin solution with a pectin precipitant;
   recovering the pectin precipitate and subjecting it to acid treatment in a range above about 15° and below about 50° C. to reduce the methoxyl content into a range of about 7 to 8.5 percent while retaining a molecular weight of at least about 150,000
   treating the resultant pectin precipitate with ammonium hydroxide at a cold temperature below about 150° C. to yield a methoxyl content in the range of about 4.5 to 7 percent with a molecular weight of at least about 120,000;
   and recovering the pectin product.

* * * * *

UNITED STATES PATENT OFFICE
CERTIFICATE OF CORRECTION

Patent No. 3,622,559    Dated November 23, 1971

Inventor(s) Haldon R. Wiles and Christian J. B. Smit

It is certified that error appears in the above-identified patent and that said Letters Patent are hereby corrected as shown below:

Column 1, lines 48 and 49, "Aug. 20" should read --Aug 30--.
Column 3, line 40, "150,000" should read --160,000--.
Column 6, lines 30-31 "$\eta^r$" should read -- $\eta_r$ --;
   line 33, "where $\eta_4$" should read --where $\eta_r$--;
   line 37, "$K = 4.7 + 10^{'7E'5}$" should read
   --$K = 4.7 \times 10^{-5}$--.

Column 8, line 65, "150,000" should read --160,000--;
   line 67, "150°" should read --15°--.

Signed and sealed this 3rd day of October 1972.

(SEAL)
Attest:

EDWARD M. FLETCHER, JR.
Attesting Officer

ROBERT GOTTSCHALK
Commissioner of Patents